(12) United States Patent
Nakagiri et al.

(10) Patent No.: US 7,202,442 B2
(45) Date of Patent: Apr. 10, 2007

(54) CABLE ARRANGEMENT FOR ROBOT ARM, AND INDUSTRIAL ROBOT UTILIZING THE SAME

(75) Inventors: Hiroshi Nakagiri, Osaka (JP); Hisao Miyahara, Osaka (JP)

(73) Assignee: Daihen Corporation, Osaka (JP)

( * ) Notice: Subject to any disclaimer, the term of this patent is extended or adjusted under 35 U.S.C. 154(b) by 0 days.

(21) Appl. No.: 11/067,399

(22) Filed: Feb. 22, 2005

(65) Prior Publication Data

US 2005/0189333 A1 Sep. 1, 2005

(30) Foreign Application Priority Data

Feb. 27, 2004 (JP) .............................. 2004-055278

(51) Int. Cl.
*B23K 9/32* (2006.01)
*B23K 9/12* (2006.01)

(52) U.S. Cl. ................. 219/137.9; 219/125.1; 901/42

(58) Field of Classification Search .......... 219/137.9, 219/125.1; 901/42
See application file for complete search history.

(56) References Cited

U.S. PATENT DOCUMENTS

| | | | |
|---|---|---|---|
| 4,539,465 A * | 9/1985 | Bosna | 219/137.7 |
| 4,670,641 A * | 6/1987 | Porsander et al. | 219/125.1 |
| 5,225,648 A * | 7/1993 | Torii et al. | 219/121.6 |
| 5,512,726 A * | 4/1996 | Arantes et al. | 219/125.1 |
| 6,392,190 B1 * | 5/2002 | Sue et al. | 219/121.59 |
| 6,858,814 B2 * | 2/2005 | Fischer et al. | 219/121.67 |
| 2004/0123353 A1 * | 6/2004 | Fischer et al. | 901/14 |
| 2004/0144764 A1 * | 7/2004 | Inoue et al. | 219/137.9 |

FOREIGN PATENT DOCUMENTS

| | | | |
|---|---|---|---|
| DE | 29720048 U | * | 4/1999 |
| EP | 0 471 855 | | 2/1992 |
| EP | 1568449 A1 | * | 8/2005 |
| FR | 2 599 568 | | 12/1987 |
| JP | 62-140794 | | 6/1987 |
| JP | 2-155572 | | 6/1990 |
| JP | 08090463 A | * | 4/1996 |
| JP | 2004114262 A | * | 4/2004 |
| JP | 2004306072 A | * | 11/2004 |

* cited by examiner

*Primary Examiner*—Jonathan Johnson
*Assistant Examiner*—Rachel E. Beveridge
(74) *Attorney, Agent, or Firm*—Hamre, Schumann, Mueller & Larson, P.C.

(57) ABSTRACT

A cable arrangement for a robot arm is provided, which includes a rotation arm and a line member such as a power cable. The rotation arm has a front end and a base end, the front end being provided with a swing shaft, the base end being provided with a rotational shaft rotatable about a longitudinal axis. The line member extends from the base end toward the front end of the arm. The rotational shaft includes a line offset member formed with at least one through-hole for passing the line member. The through-hole as a whole is offset from the axis of the rotational shaft.

13 Claims, 15 Drawing Sheets

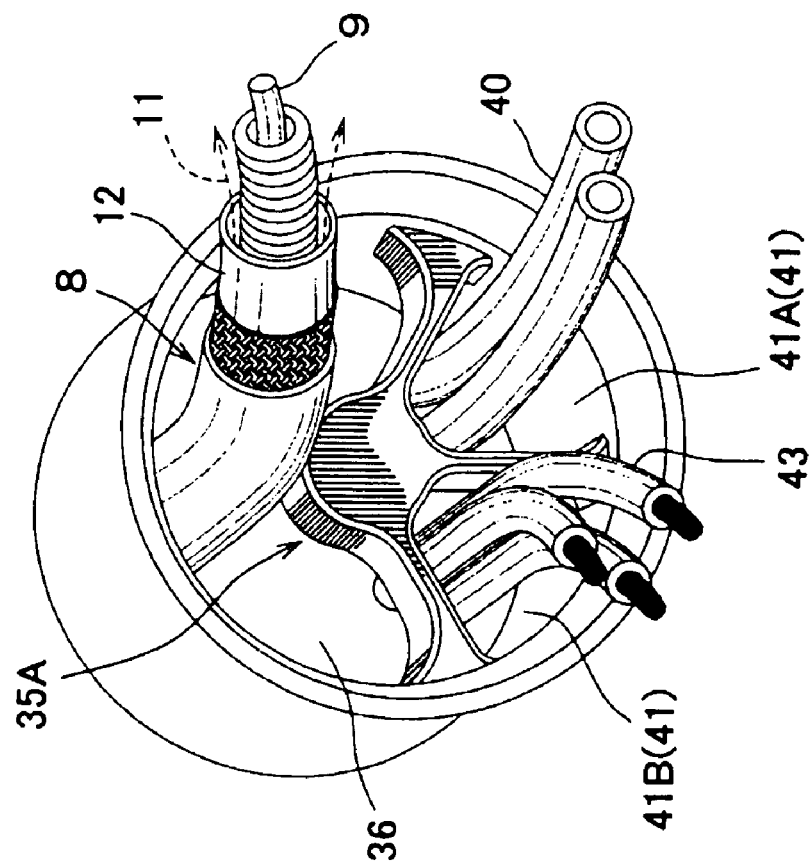
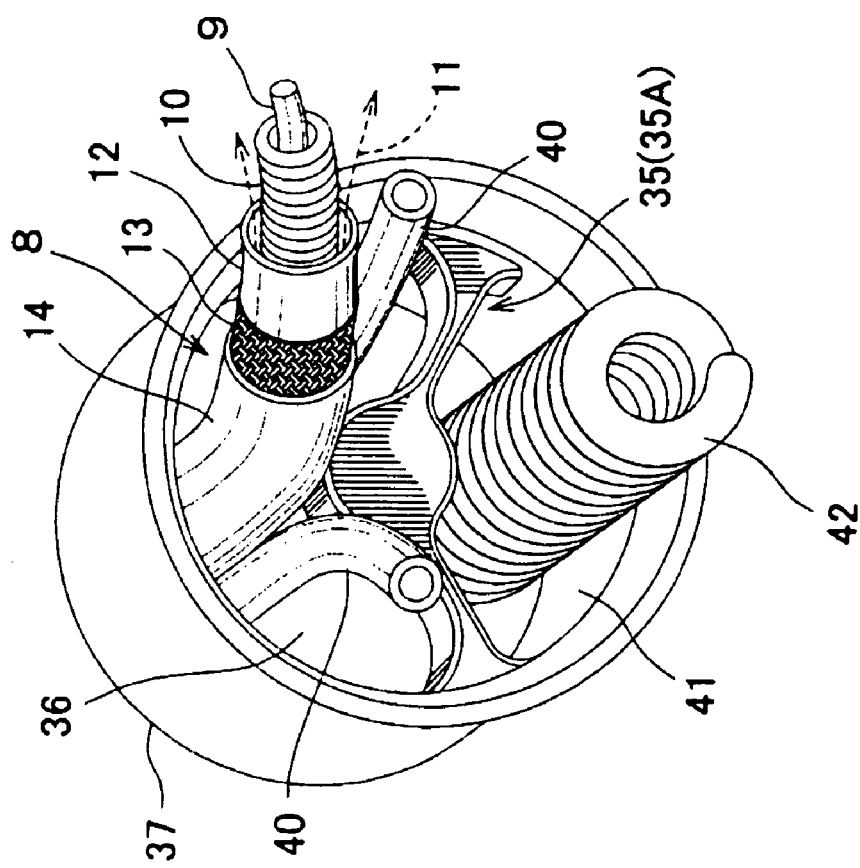

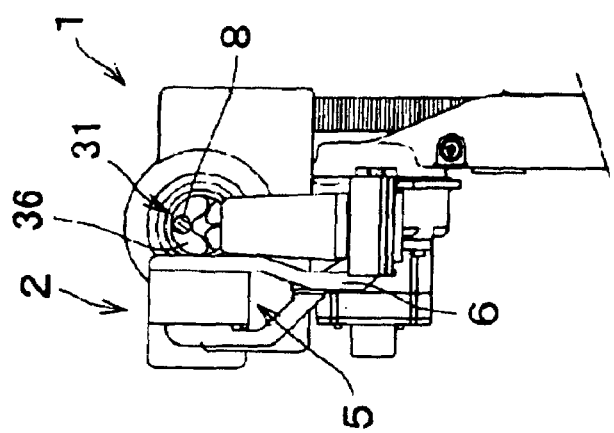
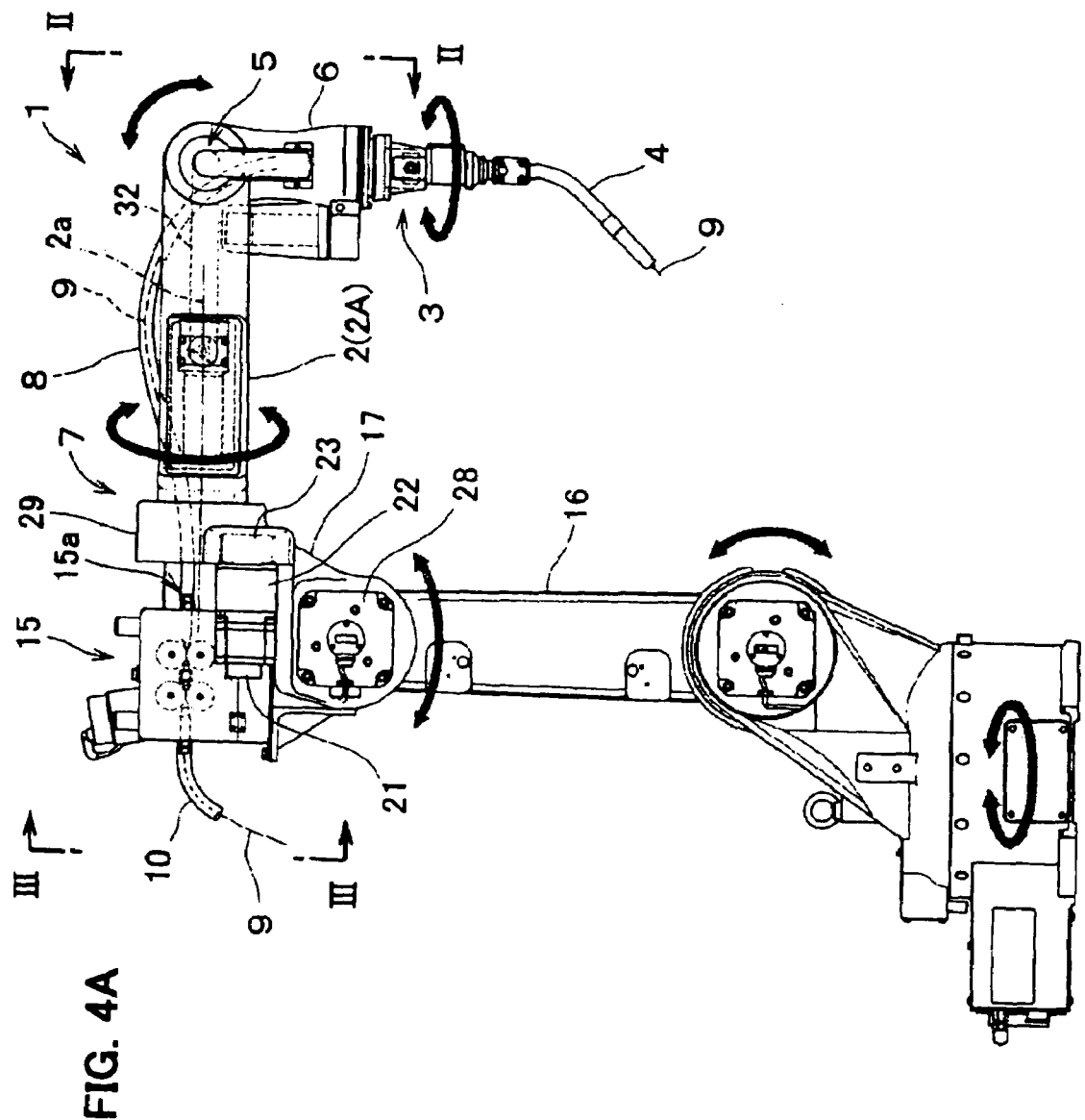

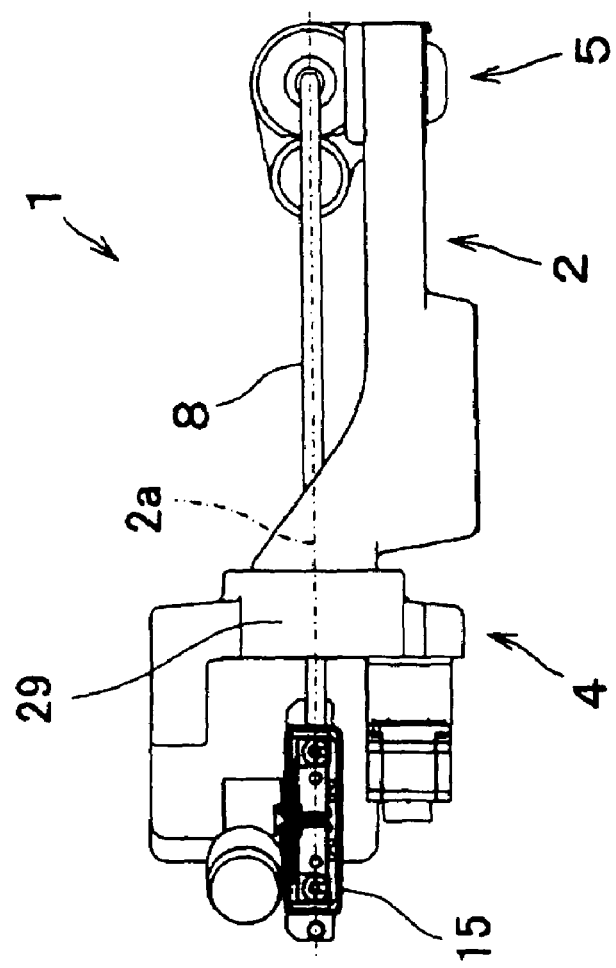
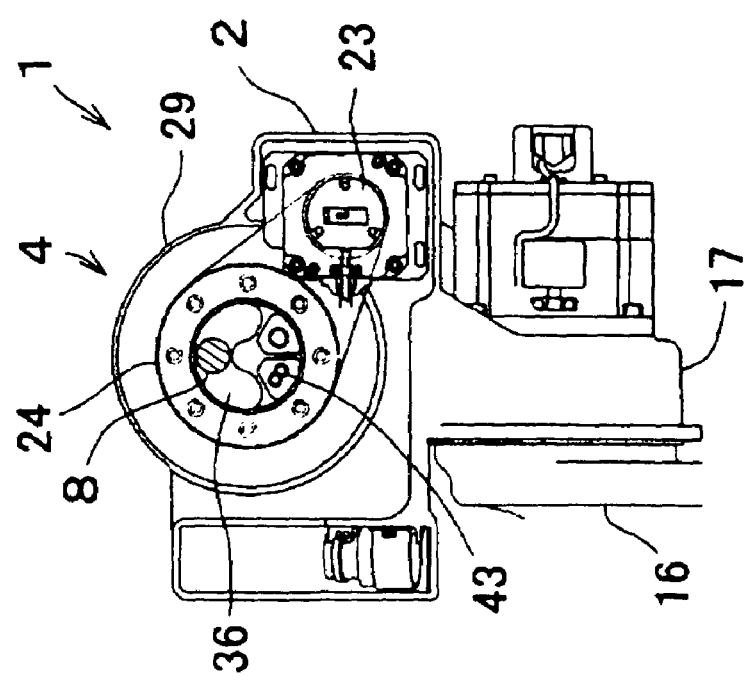
FIG. 5A
FIG. 5B

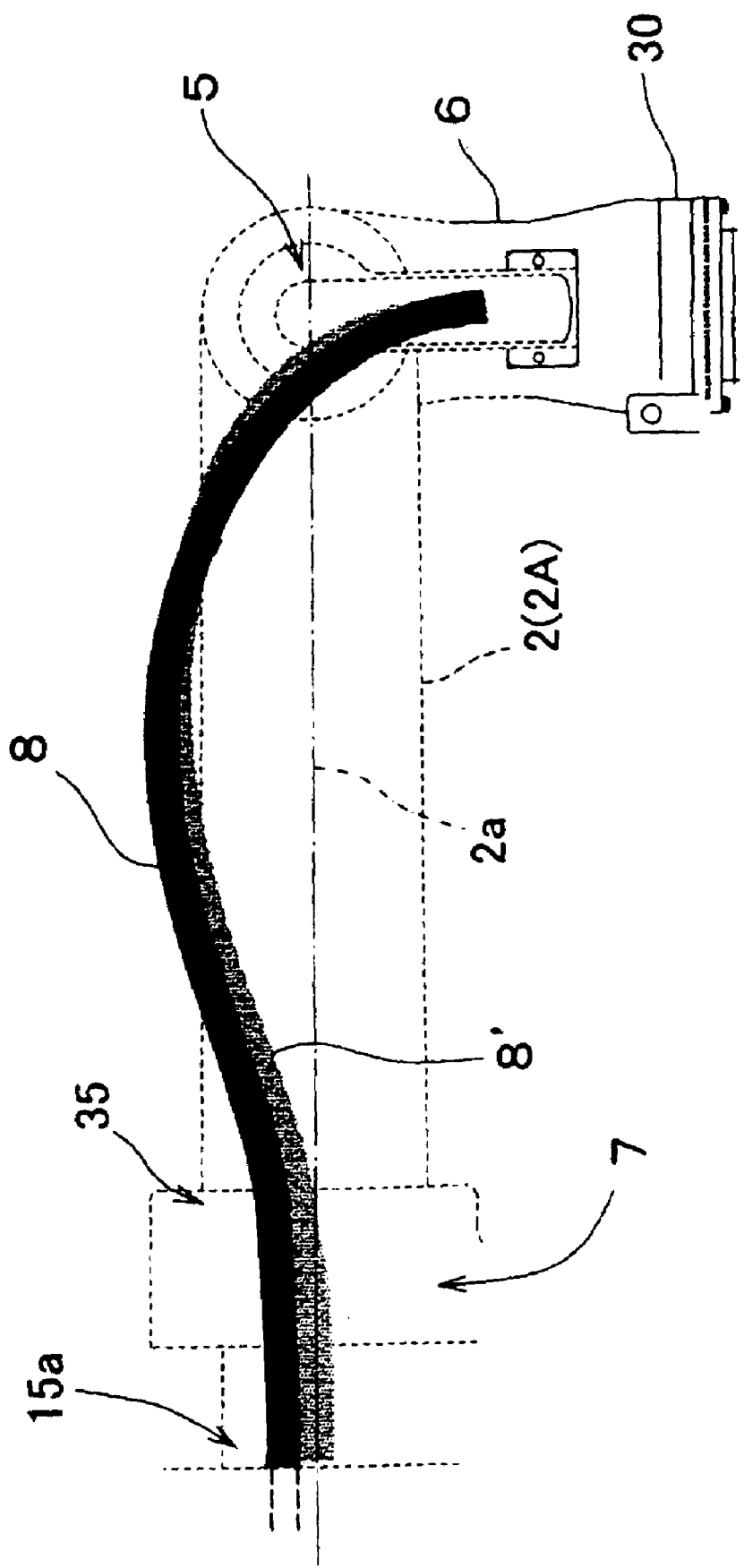

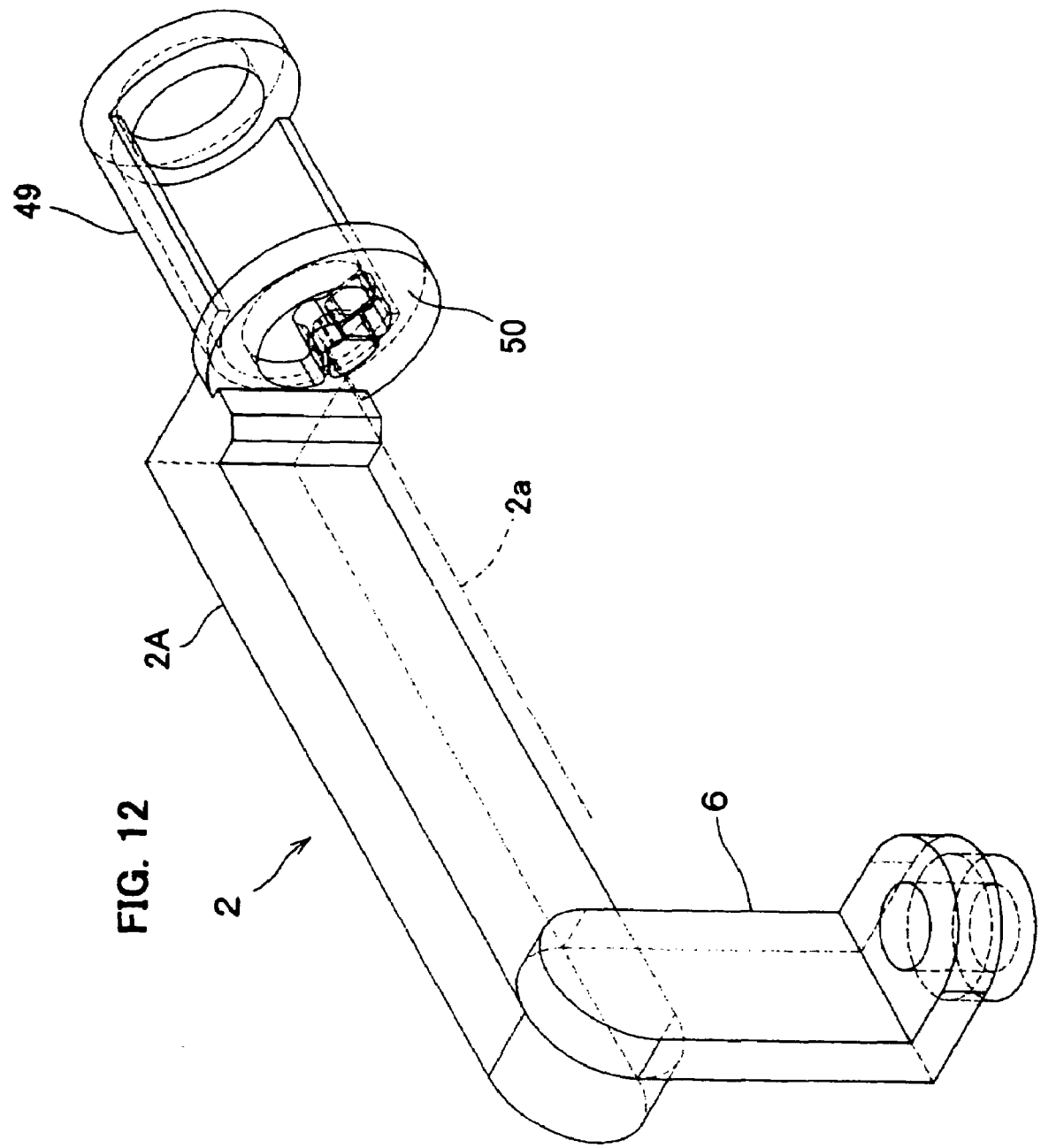

CABLE ARRANGEMENT FOR ROBOT ARM, AND INDUSTRIAL ROBOT UTILIZING THE SAME

BACKGROUND OF THE INVENTION

1. Field of the Invention

The present invention relates to an arrangement for a cable or any other line member with respect to a robot arm. The present invention also relates to an industrial robot to which such a cable arrangement is applied.

2. Description of the Related Art

Arc-welding robots are equipped with a welding wire feeder so that supplementary filler wire (consumable electrode), unwound from a wire reel, is fed to the welding torch. At the torch, the wire is melt with electric energy to perform welding continuously. The wire feeder is provided with presser rollers for forwarding the filler wire under pressure to the welding torch.

Arc-welding robots typically have multiple joints. For example, the entire arm mechanism includes a total of six joints, namely, first through sixth joints, and these joints are individually operated for causing the operational arm to rotate, swing, pivot or tilt. As a result, the end effecter can manipulate the welding torch. The wire feeder is mounted on a tilt table which supports the rotational upper arm and is caused to pivot at one end of a lower arm (the upper end of the lower arm when held in the upright position). The pivotal movement of the tilt table is implemented by the operation of the relevant joint, which is typically the third joint among the six joints.

The wire reel and the wire feeder are connected with each other by a cable, and the wire feeder and the welding torch are connected with each other by another cable. The former cable is a conduit pipe for guiding the movement of the filler wire. The latter is a multi-layered single-line power cable (torch cable), including a conduit pipe for the filler wire, an outside layer through which shielding gas is supplied, another outside layer serving as a power line, and an outermost insulating sheath.

Because of the multi-layer structure, the torch cable tends to be rigid and therefore is difficult to handle. Conventionally, in an attempt to alleviate the difficulty in manipulating the welding torch, the torch cable is made long enough to be amply slack. Specifically, in order to render the cable flexible, the cable from the wire feeder to the welding torch is placed outside of the arm, making sure that appropriate deformation is possible when the welding torch is caused to face in the desired direction (upward, downward, to the right or left, etc.).

In operating a welding robot, the operability or movable range of the welding torch is limited by the length and flexibility of the torch cable, for example. As is often the case, the torch cable can be worn out in repeated bending action of the arm, which is a problem of the prior art. Another problem is that when the welding arm in motion comes to a sudden stop, for instance, the torch cable tends not to stop together with the welding arm, but continues to swing due to its inertia. Such undesired movement disturbs smooth feeding of the welding wire through the conduit pipe. Thus, conventionally, the arm acceleration and deceleration must be controlled at the sacrifice of the mobility of the robot.

Further, the conventional torch cable arrangement causes the following problem. When a welding robot is operated with other robots, jigs, etc. placed around, or is used for welding an area inside of a container (which may be cylindrical or box-like, for example), the torch cable may come into direct interference with the things around or the side walls of the container, which results in poor operation efficiency and poor quality of products.

For the purposes of increasing the movable range of the welding torch and improving the welding quality, several proposals have been conventionally made. For example, JP-A-S62-140794 discloses a 3-joint wrist utilizing a hollow driving shaft within which a cable, an air pipe or a paint pipe is arranged to extend along the longitudinal axis. As another example, JP-A-H02-155572 discloses an arrangement that a torch cable runs at the center of each joint.

As described above, the conventional torch cable is routed along the longitudinal axis of the arm so as to pass the center of a driving shaft or a joint. This arrangement is adopted because it is thought to minimize the torch cable deformation even under a circumstance where the joints are repeatedly operated.

However, such an idea can only hold true when the multi-joint robots use their joints primarily in rotating or twisting movements but not much for swinging or tilting movements. The arrangement is not always ideal when the multi-joint robot has to work with much bending operation, or keep a bending attitude. In the case of an arc-welding robot for example, the welding torch must often be set or maintained in a predetermined attitude in order to create a good molten pool which determines welding quality. In a 6-axis (6-articulated) robot for example, an arm member at the fifth shaft (fifth joint) needs to be rotated through e.g. 120 degrees at maximum.

In this case, if the arrangement is to lay the torch cable to pass the center of driving shaft or the joint, closely along the longitudinal axis of the rotation arm, the torch cable, after passing the center of the fourth shaft, will deform by gradually leaving the longitudinal axis of the rotation arm in an upward direction, and then bending downward along the fifth shaft, into the shape of a question mark '?'. When the torch cable is deformed into a question mark, stress tends to accumulate at places of the conduit pipe where the torch cable rises from the rotation arm longitudinal axis and where it bends sharply downward. The stress accelerates the wear-out of the torch cable.

Since the conduit pipe has a larger inner diameter than that of the filler wire, curvature of the conduit pipe and curvature of the filler wire are not identical with each other. The curvature difference causes the filler wire to rub against the conduit pipe at least two locations, i.e. before and after the bend. The rubbing location changes as the curvature varies, and the friction force acting between the conduit pipe and the filler wire varies as the conduit pipe deforms, which results in unstable feeding speed.

Likewise, as the fifth shaft varies its posture or the amount of bend (tilting angle), the movement influences the upstream torch cable. Specifically, curvature of the cable changes between the fourth shaft and the fifth shaft, which results in difference in the length of conduit pipe and the length of filler wire. The amount of change in the length of conduit pipe is compensated by the same amount of sliding movement of the filler wire in or out of the welding torch. This results in undesirable variation in the amount of wire supply, disturbing the welding arc, making impossible to achieve significant improvement in the welding quality.

SUMMARY OF THE INVENTION

The present invention has been proposed under the circumstances described above. It is therefore an object of the present invention to provide a cable arrangement for a robot arm.

Specifically, a robot arm comprises a front end and a base end, where the front end has a swing shaft, and the base end has a rotational shaft which is rotatable about an axis extending longitudinally of the robot arm. In the inner space of the robot arm or adjacent space, a cable or cables are laid to extend from the base end toward the front end of the arm. According to the present invention, these cables are so arranged not to be unduly bent or twisted upon operation of the robot arm. In a preferred embodiment, as shown in FIG. 1, a robot arm 2 comprises a rotatable shaft 7 disposed at a base end of the arm, and the shaft 7 is provided with a cable offset member 35. Several cables such as a torch cable 8 and control cables 43 are arranged to extend along the length of the arm 2. The cable offset member 35 is formed with at least one through-hole 36 for permitting the passage of the cable(s), wherein the opening of the through-hole 36 as a whole is offset from the rotational axis 2a of the arm 2 (in other words, the axis 2a does not extends through the through-hole 36).

Referring to FIG. 6B, the through-hole 36 may be an elongated and arcuate opening, half-surrounding the axis 2a of the arm 2. The cable 8 is free to move in the through-hole 36. As shown in FIG. 1, the cable offset member 35 may be formed integral with a guide pipe 37, and this guide pipe is rotatably supported in the shaft 7 via a roller bearing 39.

FIG. 8A shows a position that the arm 2 takes when a swing shaft 5 extends horizontally. In this state, the through-hole 36 is located on an upper side of the cable offset member 35 (see FIGS. 6A–6D). As shown in FIG. 2A, the cable 8 may be a single-type cable having an inner space through which welding wire is fed by a welding wire feeder. As shown in FIG. 1, the wire feeder 15 has a welding wire outlet 15a located above (upwardly offset from) the rotational axis 2a of the arm 2.

As shown in FIG. 2B, the cable offset member 35 may be formed with additional through-holes 41, 41A, 41B for permitting the passage of other cables (line members). In the illustrated example, reference numeral 40 denotes hoses for cooling water. The additional through-holes are also offset from the rotational axis 2a of the arm 2 like the above-mentioned through-hole 36. Such through-holes may be provided by fitting a space separator (having a required number of partition walls) into the guide pipe 37.

According to the present invention, as shown in FIG. 9, use may be made of a tubular rotatable shaft 45, and around this shaft, a cable 43 such as a control cable may be provided.

The above-described cable arrangement for a robot arm is advantageously applied to many kinds of industrial robots, typically a multi-joint arc-welding robot. Specifically, the cable arrangement of the present invention is applicable to the rotatable shaft 7 and the swing shaft 5 (see FIG. 4A). In general, the illustrated shafts 7 and 5 may correspond to fourth and fifth shafts of a six-shaft manipulator.

According to the present invention, the following advantages are enjoyed.

As noted above, a through-hole is formed at the base end of the rotation arm along which line members such as cables are laid, and the opening as a whole is offset from the rotational axis of the arm. Therefore, even if the swing shaft operates at the tip of the rotation arm to bend the cables, it is possible to minimize the influence of the bending on the cables, since the through-hole (and hence the cables) is offset from the rotational axis. When the swing shaft operates in order to face upward or downward the welding torch, the cable can be disposed well above the rotational axis of the rotation arm at the base end of the rotation arm.

When the through-hole is formed elongated to partially surround the rotational axis of the arm, the cables can be moved freely in the through-hole even when the arm rotates, which would otherwise unduly twist or bend the cables. With such an arrangement, the cables can remain in a stress-free state as much as possible during the operation of the rotation arm.

Preferably, the cable offset member is rotatably supported relative to an outer rotational shaft. In this manner, even if the rotation arm is rotated beyond the limit at which the through-hole can absorb the deflection of the cables, it is possible to keep the cables unaffected by the over-turning of the arm. When the cable offset member is rotatably supported relative to the outer rotational shaft, the through-hole for the cables may be small enough to give no room for the cables to move therein.

Preferably, the cable offset member may be formed integral with a guide pipe which is rotatably fitted into the above-mentioned outer rotational shaft. With such an arrangement, the supporting member for the cables can be held stable in the rotation arm, while being free to rotate about the rotational axis of the arm.

Preferably, each of the cables may be a single-line power cable comprising an inner space for feeding welding wire and a power conduction path for welding, as well as a gas supply path for feeding shield gas for welding.

Preferably, a wire outlet of the wire feeder may be provided above the rotational axis of the rotation arm, so that a torch cable extending from the wire feeder to the above-mentioned supporting member is offset upward from the rotational axis of the arm. With such an arrangement, it is possible to prevent the torch cable from being bent at portions adjacent to the wire feeder, whereby the welding wire feeding operation can be performed smoothly.

Preferably, the supporting member may be formed with an additional through-hole for passing a line member such as a cooling water hose or a control cable. With such an arrangement, it is possible to prevent the torch cable from being entangled with other cables. The additional through-hole may be entirely offset from the rotational axis of the rotation arm.

The guide pipe may be partitioned into a required number of through-holes by a separator that includes radially extending partition pieces.

Preferably, the rotational shaft may have its outer circumferential surface used for laying cables thereon. This arrangement prevents these cables from suffering the influence of rotation of the arm without relying on a through-hole formed in the supporting member. Accordingly, the through-hole for the torch cable in the supporting member can be elongated and large in area as much as possible.

Preferably, the cable arrangement described above may be applied not only to a welding robot but to other kinds of industrial robots such as a painting robot, for example. The cable arrangement being employed, a lesser stress is put on the cables, thereby contributing to the prolongation of the life of the robot.

The present invention is advantageously applied to a multi-joint robot, in particular, a 6-axis manipulator. In this instance, the present invention may preferably be applied to the cable arrangement between the fourth shaft and the fifth shaft of the manipulator. In this manner, it is possible to minimize the influence of the bending operation (repetitive bending or holding the bent state) at the fifth shaft on the upstream portions (i.e., toward the fourth shaft) of the torch cable. As a result, excellent mobility of the welding torch (which means a greater coverage of operation areas, higher operational efficiency, etc.) is ensured, and meanwhile the feeding of the welding wire can be performed properly. Thus, high-quality welding will result, and a prolonged life of a conduit is expected.

Other features and advantages of the present invention will become apparent from the detailed description given below with reference to the accompanying drawings.

BRIEF DESCRIPTION OF THE DRAWINGS

FIGS. 2A and 2B are perspective views showing examples of cable offset members that are formed with through-holes for passing cables;

FIG. 4A is an overall view showing the multi-joint arc-welding robot;

FIG. 4B is a partial front view of the welding robot, with the welding torch omitted;

FIG. 5A is a rear view mainly showing the upper arm of the welding robot;

FIG. 5B is a plan view of the upper arm of FIG. 5A;

FIGS. 7A and 7B are comparative views illustrating the bending condition of the torch cable;

FIG. 12 is a perspective view showing an upper arm having a non-tubular rotational shaft.

DETAILED DESCRIPTION OF THE PREFERRED EMBODIMENTS

Hereinafter, a cable arrangement for a robot arm and an industrial robot employing such a cable arrangement will be described with reference to the accompanying drawings.

Figure 3A:
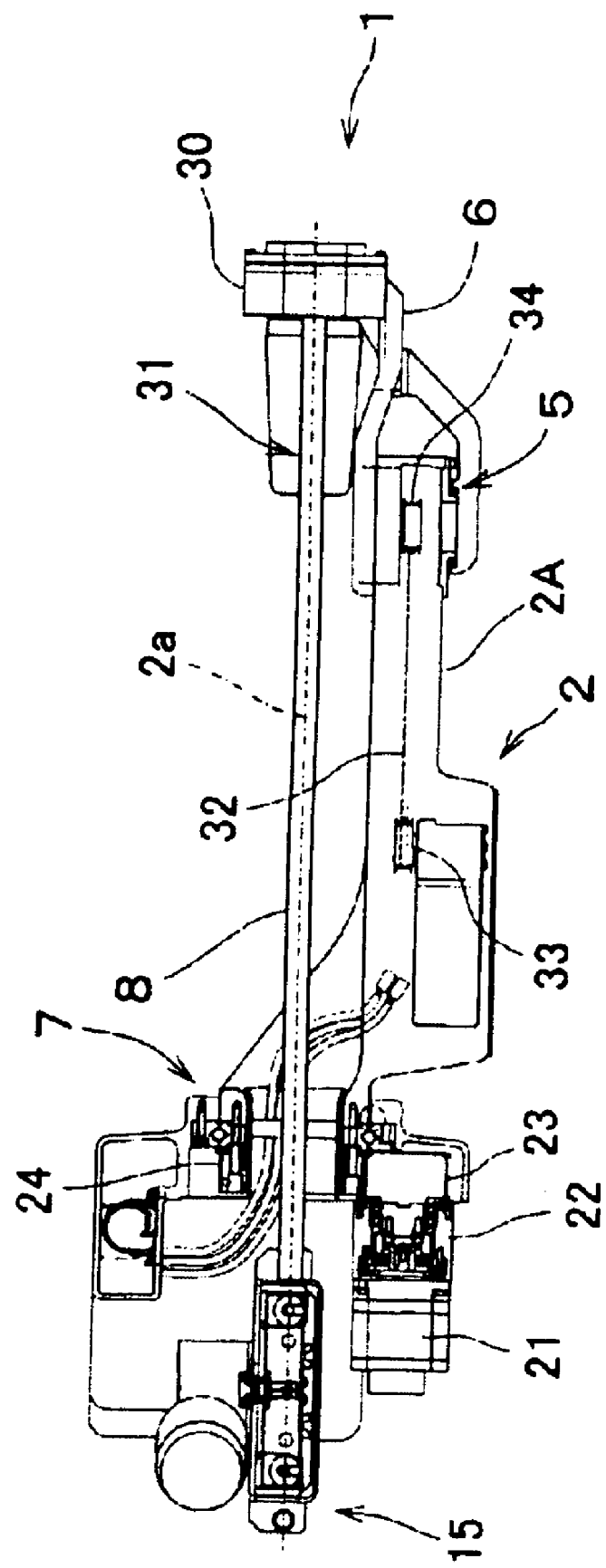
FIG. 3A is a plan view showing an upper-half assembly of a multi-joint arc-welding robot to which the present invention is applied.
Figure 3B:
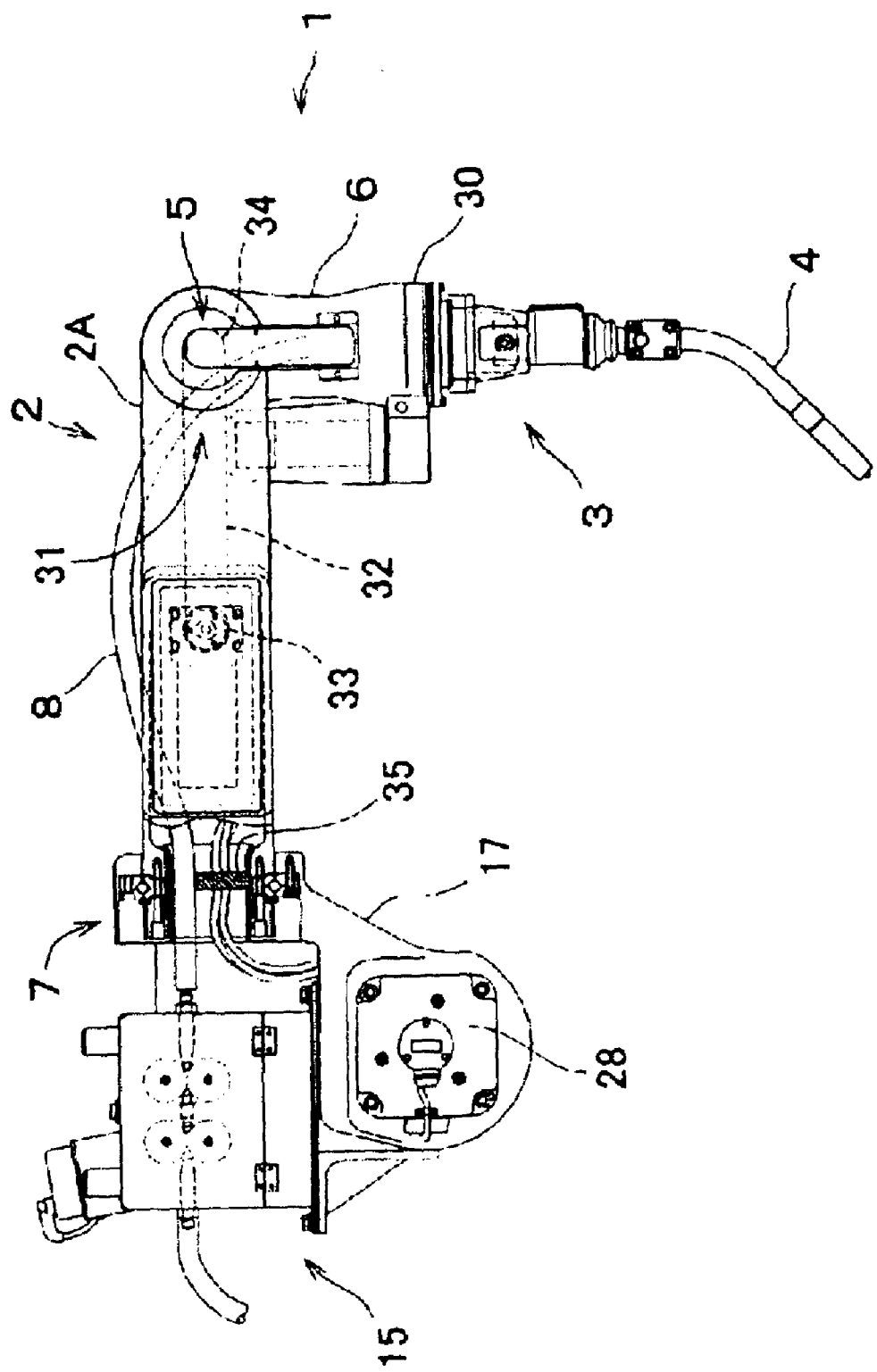
FIG. 3B is a front view showing the upper-half assembly of FIG. 3A.

Reference is first made to FIGS. 4A–4B and 5A–5B showing a multi-joint arc-welding robot 1 to which the present invention is applied. FIG. 4A is a front view of the robot, FIG. 4B is a sectional view taken in lines II-II in FIG. 4A, FIG. 5A is a sectional view taken in lines III-III in FIG. 4A, and FIG. 5B is a plan view of the robot. Aside from FIG. 5A, all of the figures show an upper arm 2 (to which the present invention is applied), illustrating its shape and the way it is attached. FIGS. 3A, 3B are a plan view and a front view illustrating how cables are arranged in the upper arm 2.

The arc-welding robot 1 includes six joints for implementing the movements indicated by the arrows in FIG. 4A. Each joint provides for implementing a rotating or twisting movement required for the arm to rotate, pivot, swing or tilt. Accordingly, the robot 1 includes six shafts (first through sixth shafts). Of these shafts, the sixth shaft 3 pivots a welding torch 4 attached to the 'wrist' or end effecter of the robot. The fifth shaft 5 is provided for causing a torch supporting arm 6 to tilt or swing at a tip of the upper arm (rotation arm) 2 designed to rotate about an axis 2a. The swing shaft 5 serves as an elevating mechanism for adjusting the angle of elevation or angle of depression of the welding torch 4. The fourth shaft 7 is at a base end of the upper arm 2, rotating the upper arm about the longitudinal axis 2a.

At each of the joints, a motor and reduction gears are provided on the relevant shaft or shafts, and the motor is driven by a command from a robot controller (not shown). To perform arc welding, welding wire (filler wire), electric power for welding, and shield gas are needed. To meet this requirement, the welding robot is provided with a torch cable independent of the motor driving system. As shown in FIG. 2A, the torch cable is a single-line power cable 8 which has a multi-layer structure for simultaneously supplying the filler wire, electric power and shield gas. Due to this multi-layer structure, the cable is inflexible and rigid enough to resist strongly to an external twisting force exerted on the cable. As a result, although the torch cable 8 is laid along the upper arm 2, initial bending to a certain extent is given to the cable 8, as shown in FIG. 3B, against the restoring force of the cable.

Referring to FIG. 2A, in the center of the torch cable 8 is a coil liner 10 through which a filler wire 9 passes through. The coil liner 10, serving as a conduit pipe, guides the filler wire and protects it from damage. The space around the outer circumference of the coil liner is used as a channel for shield gas 11, which passes through a hose 12 to the welding torch. The outer circumference of the hose is covered by a conductor net 13, and the entire cable is protected by insulation sheath 14.

Returning to FIG. 4, the filler wire 9 is sent to the torch cable 8 by a filler wire feeder 15. The wire feeder 15 is mounted on a tilt table 17, which tilts at an top of a lower arm 16 (when held in the upright position). The tilt table 17 rotatably supports the base end of the upper arm 2. The wire feeder 15 has a wire leaving port or outlet 15a above the rotational axis 2a of the upper arm 2. The reason why the wire outlet 15a is offset above the rotational axis 2a is to cause the torch cable 8 to extend along the arm 2 as straight as possible, so that the filler wire 9 can be fed smoothly inside of the cable 8.

Figure 1:
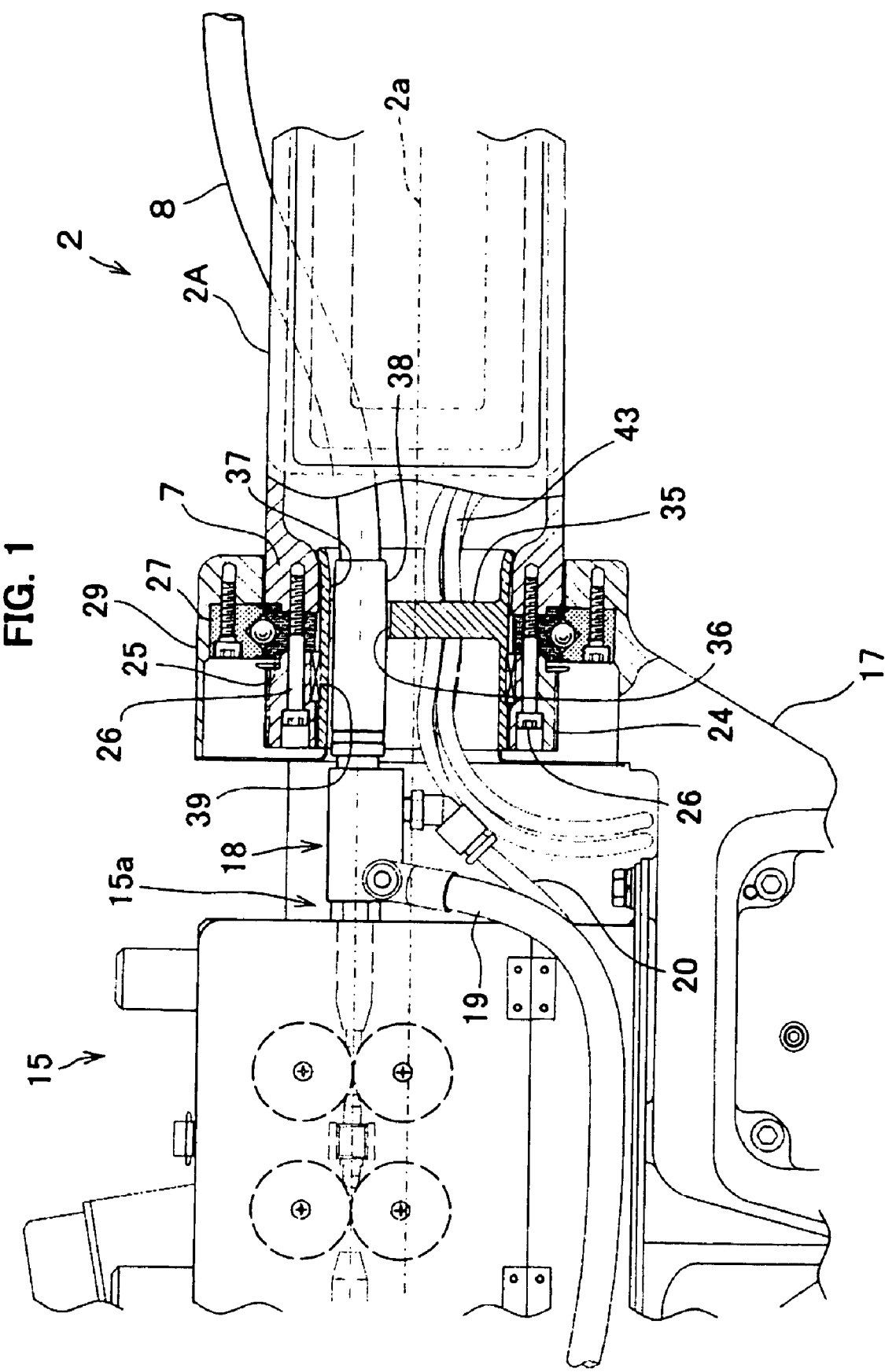
FIG. 1 illustrates an upper arm of a welding robot to which a cable arrangement of the present invention is applied.

The torch cable 8 is provided downstream from the wire outlet 15a. As shown in FIG. 1, the torch cable 8 is provided, at its base end, with a relay connector 18 to receive welding power and shield gas supplied from a power cable 19 and a gas hose 20, respectively, connected to the relay connector 18. Via the connector 18, the welding power and the shield gas are forwarded to the welding torch 4.

The fourth shaft 7, used for rotating the upper arm 2, is a rotational shaft provided at the base end of the arm 2. The fourth shaft 7 is driven by the motor 21 (see FIG. 4) via a speed reducer 22, a small pulley 22 (attached to the output shaft of the reducer 22), a timing belt (not shown), and a large pulley 24 (see FIG. 1). More specifically, the fourth rotational shaft 7 is an assembly consisting of an arm member 2A of the upper arm 2, the inner race 25 of a roller bearing, and the large pulley 24, where the inner race 25 and the pulley 24 are fixed together to the base end of the arm member 2A by fixing means such as bolts 26. This assembly is supported by a bearing case 29 which is provided with an outer race 27 and fixed to the tilt table 17 to be operated by the third shaft 28 (see FIG. 4A). According to the present invention, use may be made of a different mechanism for rotating the upper arm 2. For instance, the upper arm 2 may be rotated by a known method utilizing a HarmonicDrive® (available from Harmonic Drive Systems Inc.), which is characterized by its hollow inner structure.

As shown in FIG. 3B, the fifth shaft 5 causes the torch supporting arm 6 to tilt at the front end of the upper arm 2. As shown in FIG. 3A, the arm member 2A of the arm 2 is offset sideways from the rotational axis 2a. The torch supporting arm 6 is connected to a torch supporting base 30 at a side portion thereof. Thus, the base 30 is supported by the arm 6 in a cantilever manner (see FIG. 3A). With such an arrangement, as shown in FIG. 3B, the torch cable 8 can pass through space 31 on a side of the fifth shaft 5, extending along the rotational axis 2a from the arm 2 to the welding torch 4. The torch cable is bent most sharply in the state shown in FIG. 3B, and becomes less bent as the torch supporting arm 6 comes closer to a horizontal position. The fifth shaft 5 is driven by a belt 32 via pulleys 33, 34.

In the illustrated example, the arm member 2A of the upper arm 2 is provided by a single element which is offset sideways from the rotational axis 2a. According to the present invention, however, the arm member 2A may be composed of two parallel elongated members, and the torch cable may be placed in between the two elongated members. As another example, the upper arm may be a tubular component inside of which the torch cable is laid. In these cases, the torch supporting base 30 can be supported at its both ends.

As understood from the above explanation, the present invention has been proposed to alleviate the bending or twisting of a cable laid within the upper arm 2 or in the adjacent space thereof, the cable extending from the base end of the arm 2 to the end effecter via the front end of the arm 2. In other words, the object of the present invention is to provide an optimized cable arrangement for an industrial robot, whereby the cable is bent or twisted as little as possible upon operation of the movable arm.

Figure 6A:
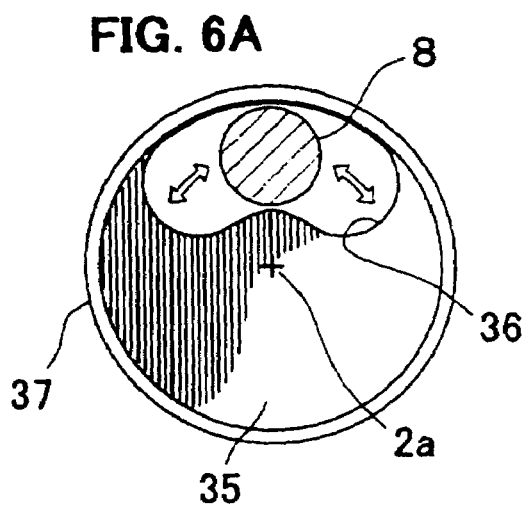
FIGS. 6A–6D illustrate examples of cable-passing through-holes formed in the cable-supporting member.
Figure 6B:
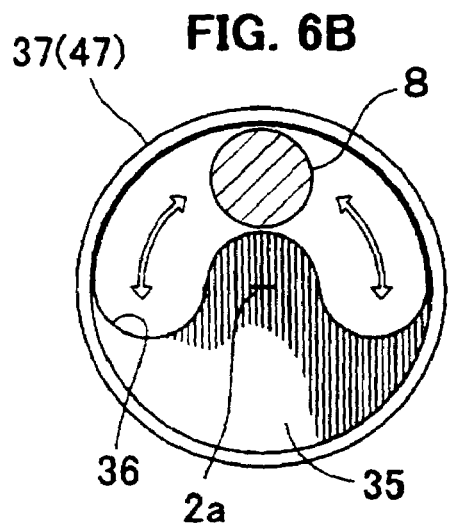

Referring to FIG. 1, the cable arrangement of the present invention is described in greater detail. As shown in the figure, the upper arm 2 (in which the torch cable 8 is laid) includes a cable offset member 35 disposed perpendicular to the rotational axis 2a. The cable offset member 35 is placed within the rotational shaft 7 located at the base end of the upper arm 2. The cable offset member 35 is formed with a through-hole 36 which allows the torch cable 8 to pass. The opening of the through-hole 36 as a whole is offset from the rotational axis 2a of the upper arm 2. The through-hole 36 is elongated around the rotational axis 2a, as shown in FIG. 6A and FIG. 6B, in order to allow for movement of the torch cable 8 therein. Thus, the cable 8 in the hole 36 can shift in position with respect to the upper arm 2.

With the above arrangement, the through-hole 36 does not firmly hold the torch cable 8. Thus, upon rotation of the upper arm 2 about the axis 2a, the torch cable 8 is not twisted, or hardly twisted in the through-hole 36. This is advantageous to alleviating the stress which would otherwise be imposed on the cable 8.

According to the present invention, the through-hole 36 may have a shape of an inversed U (or a horse shoe) or any other shape as long as it allows the torch cable 8 to move in directions indicated by the arrows. In this connection, reference is made to FIGS. 2A and 2B illustrating practical examples of the through-hole 36 shown in FIGS. 6A–6C. The illustrated cable offset member 35 is provided by a space separator 35A having radially extending partition pieces. In this instance, the through-hole 36 is an open space defined by a guide pipe 37 (to be described later) and the space separator 35A. As seen from FIG. 1, the rotational shaft 7 rotatably supports the guide pipe 37 in which the cable offset member 35 is provided.

When the guide pipe 37 is partitioned radially and the resulting spaces are used as cable-passing through-holes, the through-holes can be large. Accordingly, each through-hole allows as much relative movement as possible for a cable such as a single-line power cable, a cooling water hose and a control cable.

When the cable offset member 35 is formed integral with the guide pipe 37 rotatable relative to the upper arm 2, it is possible to prevent the above-mentioned cables from becoming unduly slack or unstable, since the guide pipe 37 rotatably fitted in the arm 2 can smoothly rotate without suffering variation in posture of the rotating axis of the pipe 37. As a result, undesired deformation of the cables is prevented. As shown in FIG. 1, the end of the torch cable 8 is covered by a rubber (or plastic) boot 38 for electrical insulation from the guide pipe 37. Preferably, the guide pipe 37 is formed of a plastic by a known molding technique, thereby attaining more reliable electrical insulation from the torch cable 8. In addition, it is easy to produce a plastic guide pipe integral with the separator 35A. Further, since the cable offset member 35 rotates together with the guide pipe 37, the relative rotation of the cables with respect to the upper arm 2 is implemented more smoothly. Reference numeral 39 denotes a roll bearing or metal liner for facilitating the free rotation of the guide pipe 37.

In accordance with the above arrangement, the cable offset member 35 is free to rotate relative to the rotational shaft 7. Accordingly, even if the upper arm 2 rotates beyond a limit at which the through-hole 36 maximally accommodates the displacement of the cable, the relative rotation of the cable offset member 35 with respect to the arm 2 prevents the torch cable 8 from being unduly bent or twisted.

As shown in FIGS. 4A–4B (see also FIGS. 6A–6C), the through-hole 36 locates at an upper-half position in the cable offset member 35 when the fifth shaft 5 is brought into a horizontally extending position (in which the torch supporting arm 6 can be swung in a vertical plane). In this state, the through-hole 36 is laterally symmetrical 'above' the axis 2a. In this connection, it should be noted that part of the through-hole 36 may come below the axis 2a in the instance shown in FIG. 6B, but the through-hole 36 as a whole is located above the axis 2a. In contrast, the through-hole 41 shown in FIG. 6C does not locate above the axis 2a but locates below it.

Figure 7B:
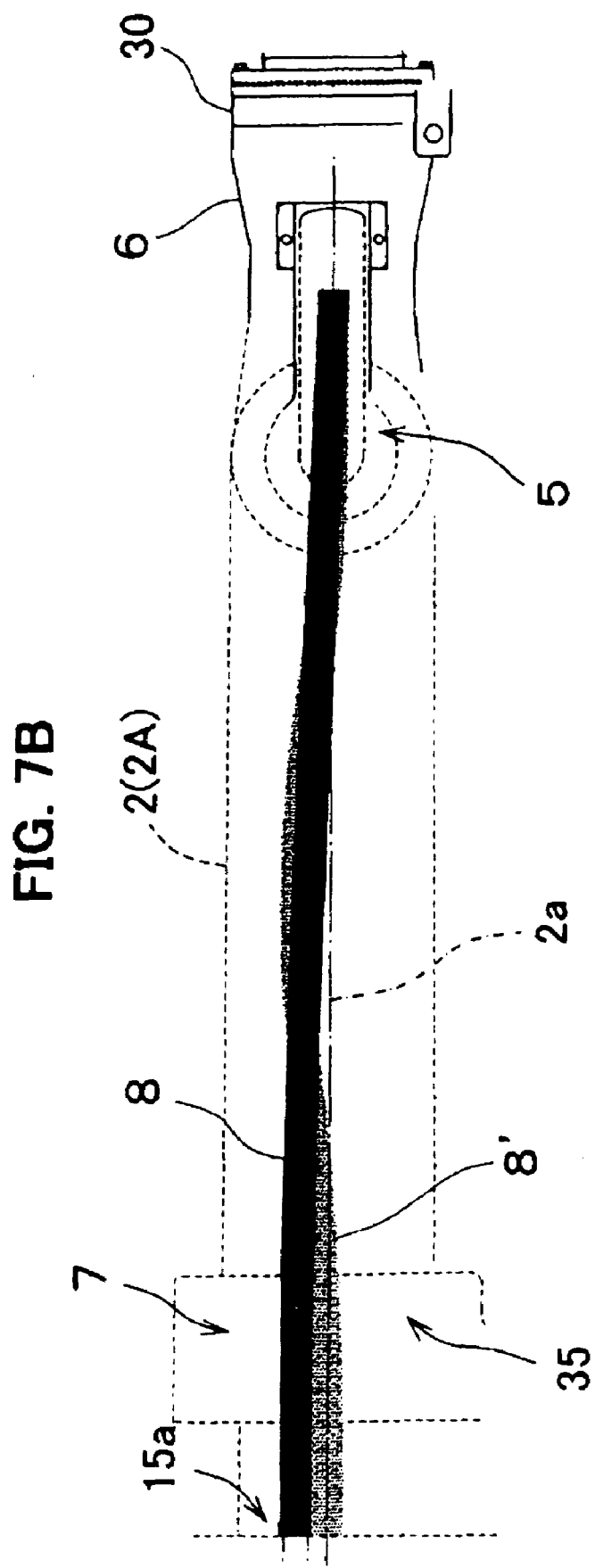

When the through-hole 36 locates in an upper part of the cable offset member 35, as noted above, advantageously the torch cable 8 is bent gently as extending from the cable offset member 35 toward the torch supporting base 30. Specifically, as shown in FIG. 3B, for example, the torch cable 8, starting from its left end, first extends generally horizontally (along a mildly arcuate trajectory), passes under the fifth shaft 5, and then extends downward toward the torch supporting base 30. In such a gentle bending arrangement, the torch cable 8 does not suffer a great stress which would otherwise be exerted on the cable. In this connection, attention is drawn to a torch cable 8' shown in Fig.7A which has its left end located on the axis 2a. As seen from the comparison with the torch cable 8 (to which the cable arrangement of the present invention is applied), the torch cable 8' is more sharply bent as it extends from the left end toward the torch supporting base 30 via under the fifth shaft 5. Accordingly, a greater stress is exerted on the cable 8', which shortens the cable's life.

The gentler bending (in other words, a smaller curvature) of the torch cable 8 implies that the cable 8 is smaller in length than the comparative cable 8'. Accordingly, the cable 8 undergoes less slack than the cable 8' when the torch supporting arm 6 is brought into the horizontal position shown in FIG. 7B. As seen from the figure, the cable 8 extends substantially straight along the axis 2a (having no inflection point), whereas the cable 8' meanders with respect to the axis 2a (having inflection points), thereby being put under a greater stress.

Figure 8A:
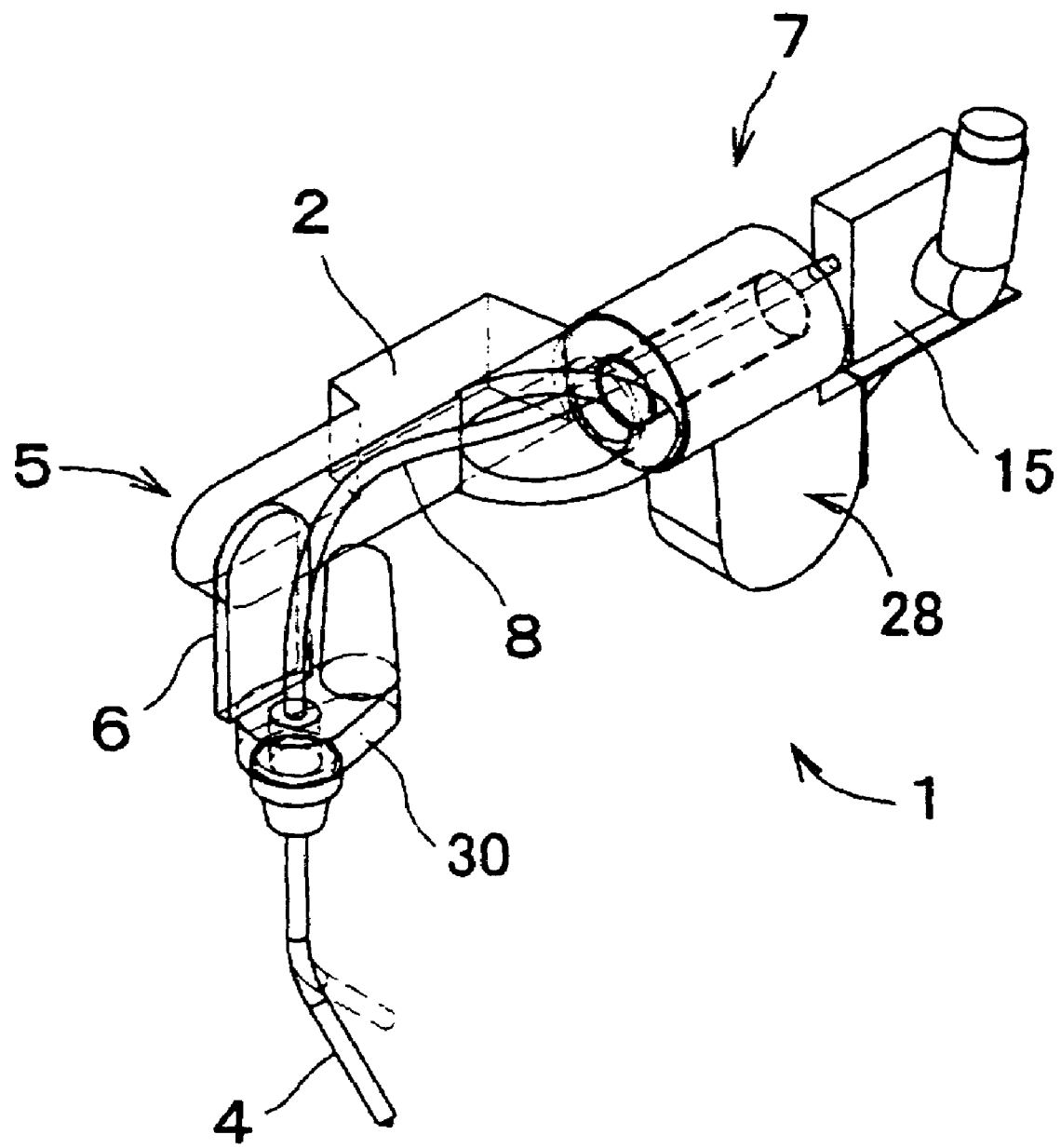
FIGS. 8A and 8B are perspective views illustrating the workings of an assembly from the fourth shaft to the welding torch.
Figure 8B:
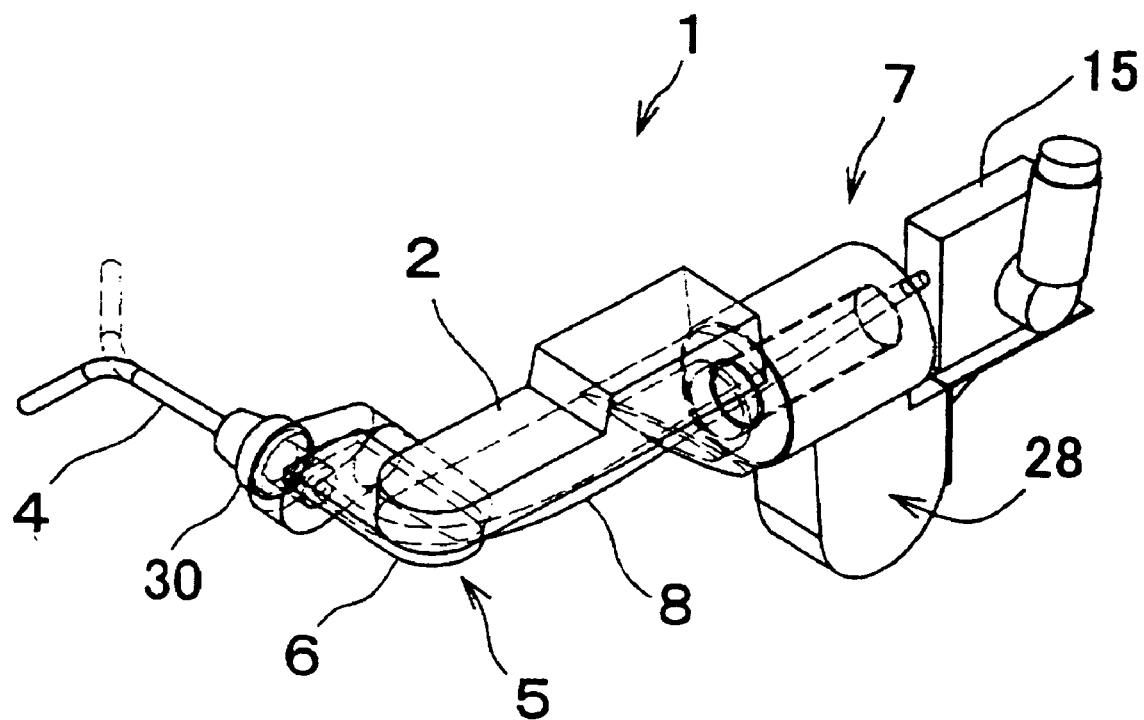

Reference is now made to FIGS. 8A and 8B. FIG. 8A is a perspective view illustrating the same assembly as shown in FIG. 3B but from a different viewpoint. FIG. 8B illustrates the state which the assembly of FIG. 8A takes after the upper arm 2 is rotated through 90 degrees about the axis 2a by the operation of the fifth shaft 7 for causing the welding torch 4 to be laterally pointed. In this state, the torch cable 8 may suffer the greatest twist resulting from the rotation of the upper arm 2. According to the present invention, however, the torch cable 8 can shift freely in the elongated through-hole 36. As a result, the twist exerted on the cable 8 is reduced.

Figure 6C:
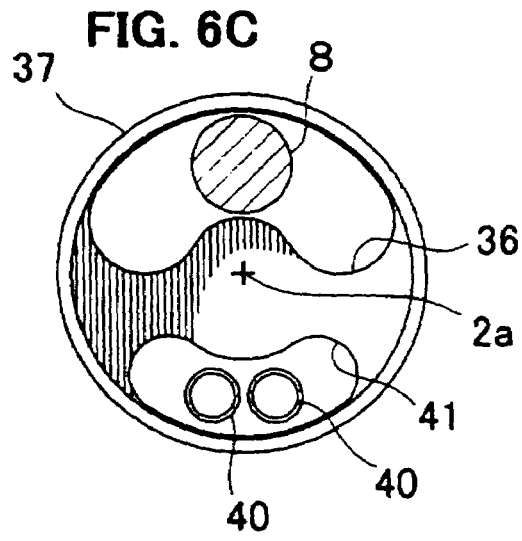

According to the present invention, as shown in FIG. 2A, a cooling water hose 40 may be inserted into the through-hole 36 in addition to the torch cable 8. The hose 40 is used for supplying water to absorb the welding heat. Alternatively, as shown in FIG. 6C, an additional through-hole 41 may be formed in the cable offset member 35 for insertion of cooling water hoses 40. Back to FIG. 2A, a curled control cable 42 is passed through the through-hole 41. In the example of FIG. 2B, three through-holes 36, 41A and 41B are provided for passing the torch cable 8, the cooling water hose 40 and the control cable 43, respectively.

In the example shown in FIG. 1, the cable offset member 35 is depicted as having a relatively small thickness. According to the present invention, however, the cable offset member 35 may have a greater thickness. For instance, the thickness of the cable offset member 35 may be generally equal to the length of the guide pipe 37. This arrangement may be advantageously applied to the three-hole design, whereby the torch cable 8 and the control cable 43 are reliably insulated from each other in the guide pipe 37. Thus, even if the torch cable 8 is damaged in the guide pipe 37, noise generated from the torch cable 8 does not reach the control cable 43.

Figure 9:
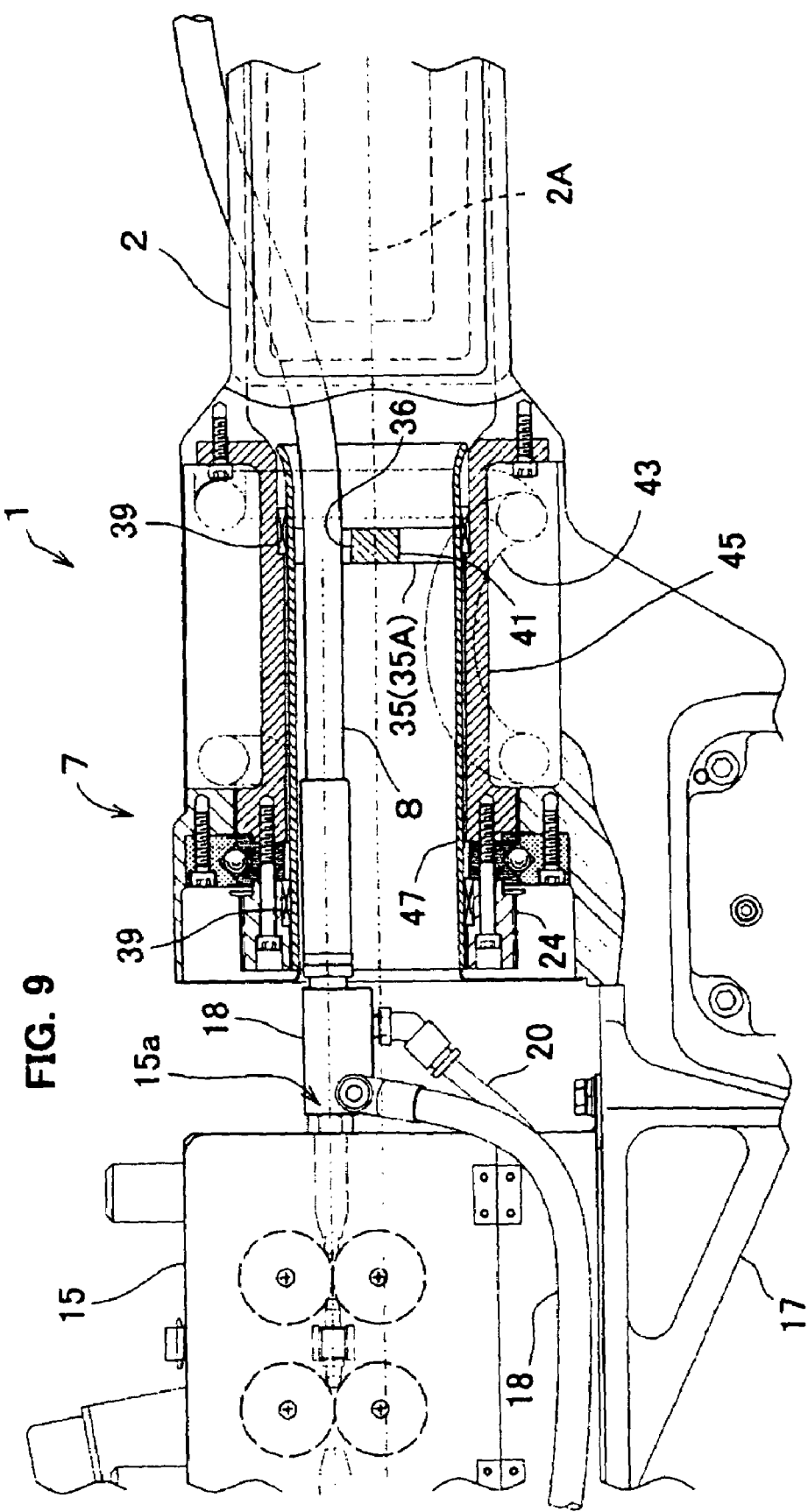
FIG. 9 illustrates the basic structure of the upper arm including a long rotational shaft.

According to the present invention, as shown in FIG. 9, a relatively long rotational shaft 45 may be used in place of the short shaft 7 of FIG. 1. In this case, the control cable 43 for the fifth and the sixth shafts is not laid inside of the shaft 45, but is provided on the external surface of the shaft 45. As shown in the figure, two roller bearings 39 (spaced from each other in the longitudinal direction of the shaft 45) are used for rotatably supporting the shaft 45. The greater length of the shaft 45 in comparison with the shaft 7 is advantageous in ensuring a follow-up margin of the control cable 43 upon rotation of the upper arm 2.

As understood from the above example, through-holes may not necessarily be used, depending on the kind of cables.

Figure 10:
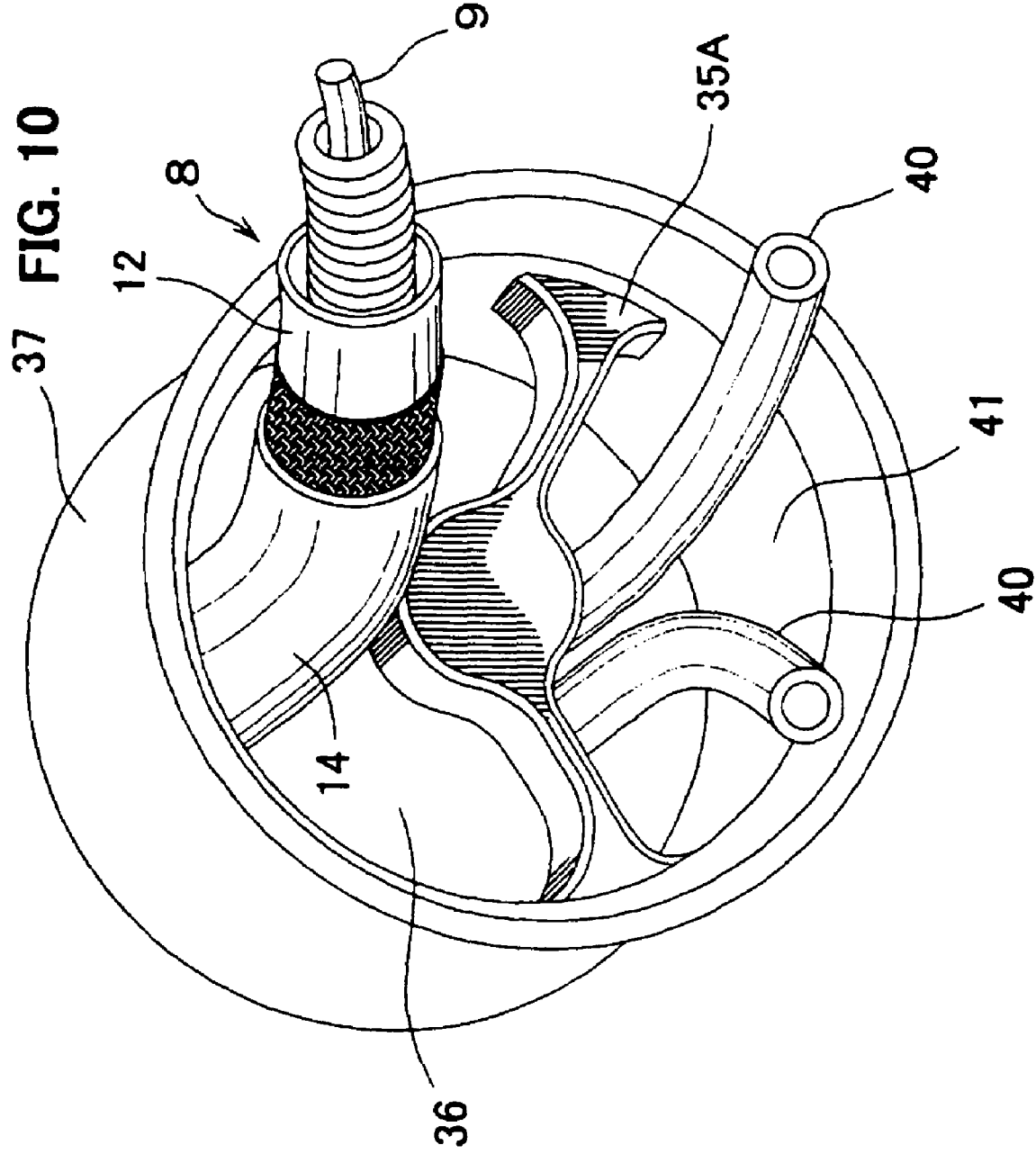
FIG. 10 is a perspective view showing a different example of a cable offset member.

FIG. 10 shows an example in which only the torch cable 8 is passed through the through-hole 36, while only the cooling water hoses 40 are passed through the other through-hole 41.

Figure 6D:
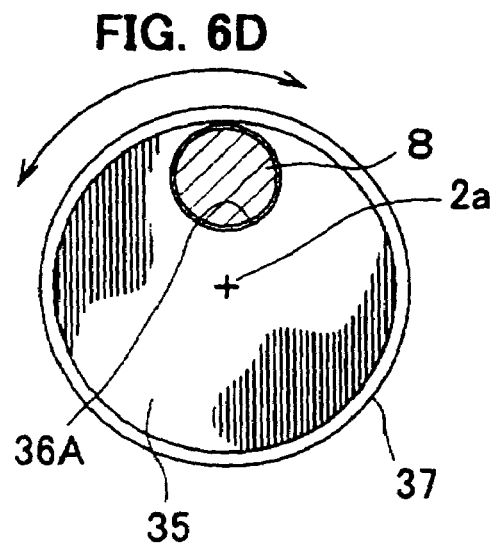

According to the present invention, as shown in FIG. 6D, the cable offset member 35 may be formed with a small, non-elongated through-hole 36A for passing the torch cable 8 as long as the cable offset member 35 or the guide pipe 37 is supported rotatably relative to the upper arm 2. In this case, the diameter of the through-hole 36A may be substantially the same as or slightly greater than that of the torch cable 8, so that there is no play (or little play, if any) to allow the displacement of the torch cable 8. In other words, the through-hole 36A is a small opening allowing insertion of the torch cable 8.

Figure 11:
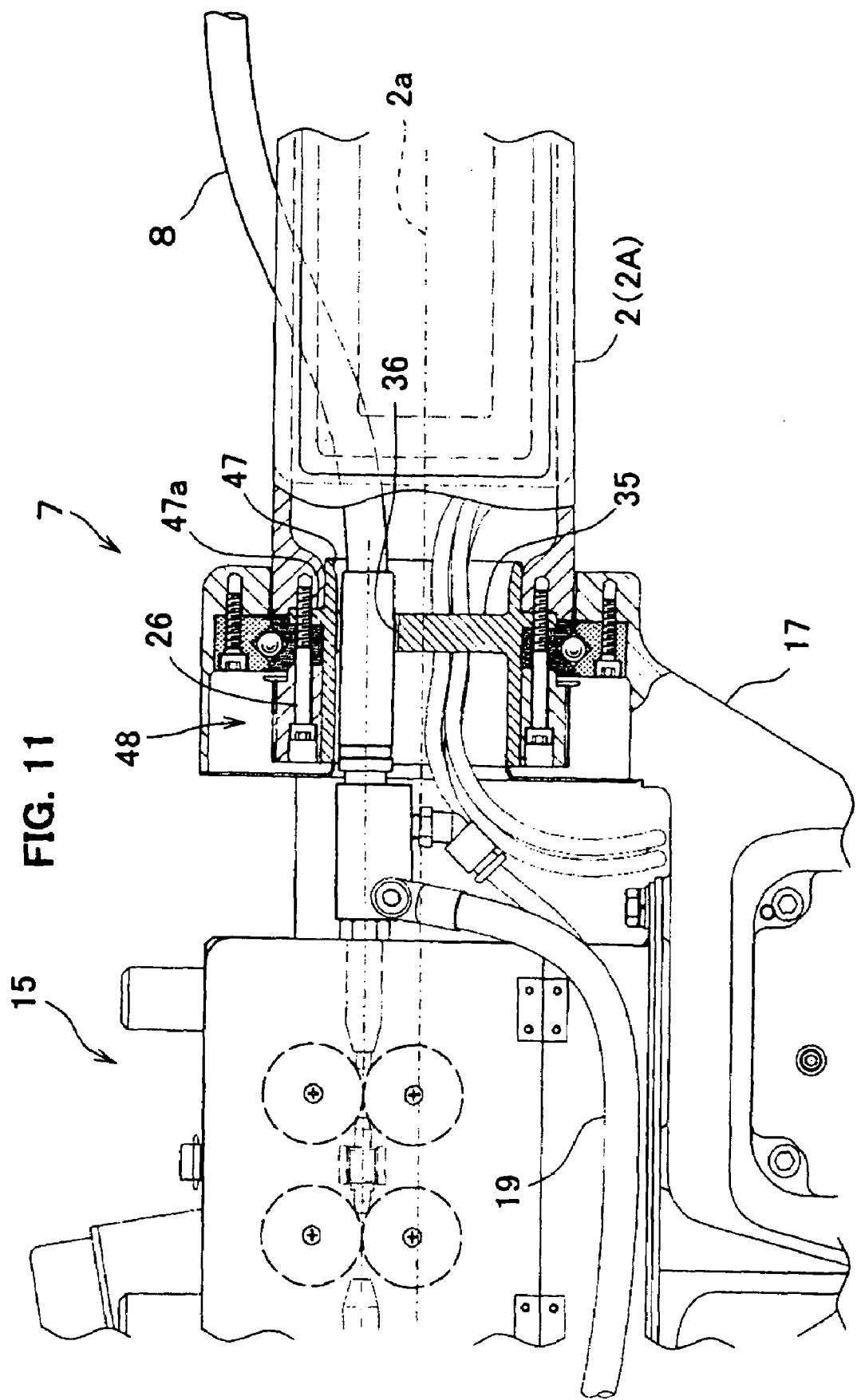
FIG. 11 illustrates a state in which a guide pipe is fixed.

FIG. 11 shows an another embodiment of the present invention, whereby both the cable offset member and the guide pipe are nonrotatable relative to the upper arm 2. Specifically, the guide pipe 47 (integral with the cable offset member 35) is formed with a flange 47a. As shown in the figure, the flange 47a is fixed to the upper arm 2 by bolts 26, thereby providing a one-piece rotational assembly 48. In this case, the through-hole 36 formed in the cable offset member 35 need be elongated enough, as shown in e.g. FIG. 6A or 6B, to provide appropriate room for permitting free displacement of the torch cable 8.

When the cable offset member 35 and the guide pipe 47 are rendered nonrotatable relative to the arm 2 as in the above case, the rotational assembly may not be a circular tube. In an example shown in FIG. 12, the rotational assembly 49 has a semi-circular cross section and is provided, at an end thereof, with a cable offset member 50 formed with at least one cable-passing through-hole.

According to the present invention, the above-mentioned guide pipe may not be used if the cable offset member is rotatably supported in the rotational assembly.

The cable arrangement of the present invention is applicable to various kinds of multi-joint industrial robots such as an arc-welding robot, a spot-welding robot, or a painting robot provided with a paint spray gun. In any of these applications, the cable arrangement of the present invention advantageously alleviates the stress exerted on cables which are used in repeatedly bending or twisting conditions, thereby serving to prolong the life of these cables. When the arc-welding robot is a six-shaft manipulator, the present invention is advantageously applied to the cable arrangement between the fourth shaft and the fifth shaft. As a result, it is possible to eliminate or minimize the adverse effect of repeated joint bending (or maintaining the bent state) which will act on the upstream torch cable. Thus, the movable range of the welding torch can be increased, and the operation efficiency can be improved. Also, the welding filler wire can be smoothly fed, which leads to high-quality welding results, and the life of the conduit pipe can be prolonged.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

The invention claimed is:

1. An arrangement of a line member for a robot arm, the arrangement comprising:
   a rotation arm including a front end and a base end, the front end being provided with a swing shaft, the base end being provided with a rotational shaft rotatable about a longitudinal axis, the rotational shaft being hollow for defining an inner space; and
   a line member extending from the base end toward the front end; wherein the rotational shaft includes a line offset member housed within the inner space of the rotational shaft and formed with at least one through-hole for passing the line member, the through-hole as a whole being offset from the longitudinal axis;

wherein the through-hole is an opening which is elongated circumferentially of the rotational shaft for permitting displacement of the line member, the through-hole partially surrounding the longitudinal axis.

2. The arrangement according to claim 1, wherein the line offset member is rotatably supported in the inner space of the rotational shaft.

3. The arrangement according to claim 1, further comprising a guide pipe rotatably supported in the inner space of the rotational shaft, wherein the line offset member is provided at the guide pipe.

4. The arrangement according to any one of claims 1, wherein the through-hole is formed in an upper side of the line offset member when the rotation arm takes a position causing the swing shaft to extend horizontally.

5. The arrangement according to any one of claims 1, further comprising a wire feeder for feeding welding wire, wherein the line member is a single-line power cable formed with an inner path through which the welding wire is fed.

6. The arrangement according to claim 5, wherein the wire feeder comprises a wire feeding outlet located above the longitudinal axis.

7. The arrangement according to any one of claims 1, wherein the line offset member is formed with an additional through-hole for passing an additional line member, the additional through-hole as a whole being offset from the longitudinal axis.

8. The arrangement according to claim 7, further comprising a space separator including a plurality of partition pieces extending radially in the rotation arm, wherein said one through-hole and the additional through-hole are defined by the space separator.

9. The arrangement according to any one of claims 1, wherein the rotational shaft is a circular tube having an external surface upon which another line member is provided.

10. An industrial robot comprising the arrangement according to any one of claims 1.

11. The industrial robot according to claim 10, wherein the robot is a multi-joint arc-welding robot.

12. The industrial robot according to claim 11, wherein the rotational shaft and the swing shaft are a fourth shaft and a fifth shaft of a 6-articulated manipulator.

13. An arrangement of a line member for a robot arm, the arrangement comprising:

a rotation arm including a front end and a base end, the front end being provided with a swing shaft, the base end being provided with a rotational shaft rotatable about a longitudinal axis;

a line member extending from the base end toward the front end;

a space separator including a plurality of partition pieces extending radially in the rotation arm;

wherein the rotational shaft includes a line offset member formed with at least one through-hole for passing the line member, the through-hole as a whole being offset from the longitudinal axis, the through-hole being defined by the space separator.

* * * * *